(12) United States Patent
Oshida

(10) Patent No.: US 9,281,732 B2
(45) Date of Patent: *Mar. 8, 2016

(54) SQUIRREL-CAGE ROTOR AND ROTATING ELECTRICAL MACHINE

(75) Inventor: Manabu Oshida, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 133 days.

This patent is subject to a terminal disclaimer.

(21) Appl. No.: 13/985,632

(22) PCT Filed: Feb. 20, 2012

(86) PCT No.: PCT/JP2012/053987
§ 371 (c)(1),
(2), (4) Date: Aug. 15, 2013

(87) PCT Pub. No.: WO2012/115044
PCT Pub. Date: Aug. 30, 2012

(65) Prior Publication Data
US 2013/0328436 A1    Dec. 12, 2013

(30) Foreign Application Priority Data
Feb. 24, 2011  (JP) ................................. 2011-038714

(51) Int. Cl.
*H02K 17/16* (2006.01)
*H02K 17/20* (2006.01)
*H02K 1/26* (2006.01)

(52) U.S. Cl.
CPC ............ *H02K 17/165* (2013.01); *H02K 17/205* (2013.01); *H02K 1/265* (2013.01); *H02K 2213/03* (2013.01)

(58) Field of Classification Search
CPC .................................................... H02K 16/165
See application file for complete search history.

(56) References Cited

U.S. PATENT DOCUMENTS 1,771,936 A * 7/1930 Morrill .......................... 310/212
1,986,368 A * 1/1935 Schwarz ....................... 310/212
(Continued)

FOREIGN PATENT DOCUMENTS

| JP | 58-112040 U | 7/1983 |
| JP | 59-209049 A | 11/1984 |
| JP | 2008-161024 A | 7/2008 |

OTHER PUBLICATIONS

English translation of Written Opinion of the International Search Authority (Eight (8) pages).
(Continued)

*Primary Examiner* — Dang Le
(74) *Attorney, Agent, or Firm* — Crowell & Moring LLP

(57) ABSTRACT

A squirrel-cage rotor includes a rotor core having in its circumferential direction a plurality of slots extending in an axial direction, a plurality of conductor bars stored in each slot of the rotor core and whose ends are projected from an axial direction end surface of the rotor core, and a pair of end rings arranged at the ends of the rotor core and each having a plurality of fitting portions into which the both ends of the conductor bars projecting from the axial direction end surface of the rotor core are fitted. In the conductor bar, among the cross-sectional shape in a plane perpendicular to the axial direction, the shape on the rotor central axis side is a circular arc shape. In the plane perpendicular to the axial direction, a gap is provided on the rotor central axis side of the fitting portion fitted with the conductor bar.

7 Claims, 13 Drawing Sheets

(56) References Cited

U.S. PATENT DOCUMENTS

| | | | | |
|---|---|---|---|---|
| 2,242,008 | A | * | 5/1941 | Leader .......................... 310/212 |
| 2,899,618 | A | * | 8/1959 | noodleman ................... 318/759 |
| 5,642,010 | A | * | 6/1997 | Carosa et al. ................. 310/211 |
| 7,659,650 | B2 | * | 2/2010 | Lee et al. ................. 310/156.81 |
| 8,405,271 | B2 | * | 3/2013 | Lee et al. ................. 310/156.57 |

OTHER PUBLICATIONS

International Search Report dated Apr. 10, 2012 with English translation (Four (4) pages).

* cited by examiner 251 226 227 228 220 254 252a 252 254

(a)          (b)

(a)  (b)

SQUIRREL-CAGE ROTOR AND ROTATING ELECTRICAL MACHINE

TECHNICAL FIELD

The present invention relates to a squirrel-cage rotor and a rotating electrical machine using the squirrel-cage rotor.

BACKGROUND ART

In the prior art, there has been known a built-up squirrel-cage rotor obtained by assembling a large number of conductor bars and an end ring on a rotor core and joining the assembly by welding or brazing, and in the squirrel-cage rotor, a width of teeth as a passage of magnetic force lines is kept constant (see, PTL 1).

CITATION LIST

Patent Literature

PTL 1: Japanese Patent Application Laid-Open No. 2008-161024

SUMMARY OF INVENTION

Technical Problem

As in the rotor disclosed in the PTL 1, when a width of teeth is kept constant, the closer to a central axis of a rotor, the smaller a width of a slot. The shape of the conductor bar inserted into the slot is similar to the shape of a fitting portion of an end ring holding the conductor bar, and an end on the rotor central axis side of the fitting portion is a circular arc shape with a small radius.

When the rotor is rotated at high speed, large rotation centrifugal force is applied to the end ring, and excessive stress is concentrated on the end on the rotor central axis side in the fitting portion of the end ring; therefore, there is a problem that the end ring is damaged.

Solution to Problem

A squirrel-cage rotor according to a first aspect of the present invention includes: a rotor core including in its circumferential direction a plurality of slots extending in an axial direction; a plurality of conductor bars which is stored in each slot of the rotor core and whose both ends are projected from an axial direction end surface of the rotor core; and a pair of end rings arranged at the both ends of the rotor core and each having a plurality of fitting portions into which the respective both ends of the conductor bars projecting from the axial direction end surface of the rotor core are fitted, wherein in the conductor bar, among the cross-sectional shape in a plane perpendicular to the axial direction, the shape on the rotor central axis side is a circular arc shape, in the plane perpendicular to the axial direction, a gap is provided on the rotor central axis side of the fitting portion fitted with the conductor bar, a curved portion is provided on the rotor central axis side of the gap, and the curved portion of the gap includes a circular arc having a radius larger than a radius of the circular arc on the rotor central axis side of the conductor bar.

According to a second aspect of the present invention, in the squirrel-cage rotor of the first aspect, it is preferable that the curved portion of the gap is provided as a circular arc having a radius larger than the radius of the circular arc on the rotor central axis side of the conductor bar.

According to a third aspect of the present invention, in the squirrel-cage rotor of the first or second aspect, it is preferable that the cross-sectional shape of the conductor bar in the plane perpendicular to the axial direction is a shape in which the thickness is gradually reduced from the outer circumferential side of the rotor toward the center side, and the curved portion of the gap is provided to face the circular arc of the end on the rotor central axis side of the conductor bar.

A rotating electrical machine according to a fourth aspect of the present invention includes: the squirrel-cage rotor of any one of the first to third aspects; and a stator provided at a distance on an outer circumferential side of the squirrel-cage rotor.

Advantageous Effects of Invention

According to the present invention, there can be provided a squirrel-cage rotor, which relieves stress concentration applied to a fitting portion of an end ring and can prevent damage of the end ring, and a rotating electrical machine using the squirrel-cage rotor.

DESCRIPTION OF EMBODIMENTS

First Embodiment

A first embodiment of a rotating electrical machine according to the present invention will be described.

[Whole Rotating Electrical Machine]

Since high rotation of a rotating electrical machine provided with the first embodiment can be realized as described below, the rotating electrical machine is suitable as a traction motor of an electric vehicle, for example. The rotating electrical machine according to the present invention can be applied to a pure electric vehicle driven by only the rotating electrical machine and a hybrid-type electric vehicle driven by both an engine and the rotating electrical machine. Hereinafter, a hybrid-type electric vehicle will be described taking as an example.

Figure 1:
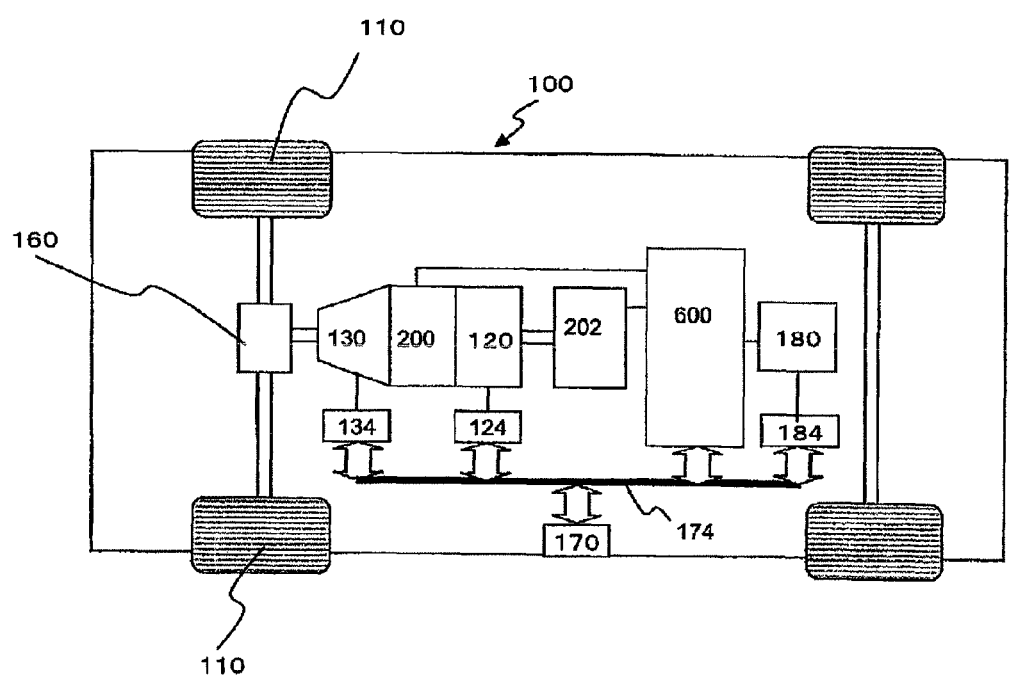
FIG. 1 is a view showing a schematic configuration of a hybrid-type electric vehicle loaded with a rotating electrical machine provided with a squirrel-cage rotor according to a first embodiment of the present invention.

As shown in FIG. 1, a hybrid-type electric vehicle (hereinafter referred to as a vehicle) 100 is loaded with an engine 120, rotating electrical machines 200 and 202, and a battery 180 of high voltage.

The battery 180 is constituted of a secondary battery such as a lithium ion battery or a nickel-metal hydride battery and outputs a direct-current power of high voltage ranging from 250 to 600 volts, or more. The battery 180 supplies a direct-current power to the rotating electrical machines 200 and 202 at the time of power driving, and the direct-current power is supplied from the rotating electrical machines 200 and 202 to the battery 180 at the time of regeneration driving. The exchange of the direct-current power between the battery 180 and the rotating electrical machines 200 and 202 is performed via a power converter 600.

A vehicle 100 is loaded with a battery (not shown) from which a low voltage electric power (for example, 14-volt electric power) is supplied, and the battery supplies a direct-current power to a control circuit to be described below.

The rotating torques of the engine 120 and the rotating electrical machines 200 and 202 are transferred to front wheels 110 via a transmission 130, and a differential gear 160. The transmission 130 is controlled by a transmission controller 134, and the engine 120 is controlled by an engine controller 124. Charging and discharging of the battery 180 is controlled by a battery controller 184.

The transmission controller 134, the engine controller 124, the battery controller 184, and the power converter 600 are connected to an integrated controller 170 via a communication line 174.

The integrated controller 170 manages output torques of the engine 120 and the rotating electrical machines 200 and 202, performs arithmetic processing of a total torque of the output torque of the engine 120 and the output torques of the rotating electrical machines 200 and 202 or a torque distribution ratio between these torques, and transmits control commands to the transmission controller 134, the engine controller 124, and the power converter 600 based on the results of the arithmetic processing.

Thus, information about states of the transmission controller 134, the engine controller 124, the power converter 600, and the battery controller 184 is input to the integrated controller 170 via the communication line 174. Those controllers are lower order controllers than the integrated controller 170. The integrated controller 170 computes a control command of each controller based on such information. The computed control command is transmitted to each controller via the communication line 174.

The battery controller 184 outputs information about charging and discharging conditions of the battery 180 and a state of each unit cell battery constituting the battery 180 to the integrated controller 170 via the communication line 174. The integrated controller 170 controls the power converter 600 based on the information from the battery controller 184 and gives an instruction of a power generating operation to the power converter 600 when determining that the battery 180 is required to be charged.

The power converter 600 controls the rotating electrical machines 200 and 202 based on a torque command from the integrated controller 170 so that the torque output or generated power following the instruction from the integrated controller 170 is generated. Thus, the power converter 600 includes a power semiconductor constituting an inverter. The power converter 600 controls a switching operation of the power semiconductor based on the command from the integrated controller 170. Such a switching operation of the power semiconductor causes the rotating electrical machines 200 and 202 to be operated as an electric motor or a generator.

When the rotating electrical machines 200 and 202 are operated as an electric motor, the direct-current power from the high-voltage battery 180 is supplied to a direct-current terminal of the inverter of the power converter 600. The power converter 600 controls the switching operation of the power semiconductor to convert the supplied direct-current power into a three-phase alternating-current power, and then to supply the alternating-current power to the rotating electrical machines 200 and 202.

On the other hand, when the rotating electrical machines 200 and 202 are operated as the generator, the rotors of the rotating electrical machines 200 and 202 are rotated and driven by rotating torque applied from the outside, whereby the three-phase alternating-current power is generated in stator windings of the rotating electrical machines 200 and 202. The generated three-phase alternating-current power is converted into direct-current power by the power converter 600, and the direct-current power is supplied to the high-voltage battery 180, so that the battery 180 is charged.

[Power Converter]

Figure 2:
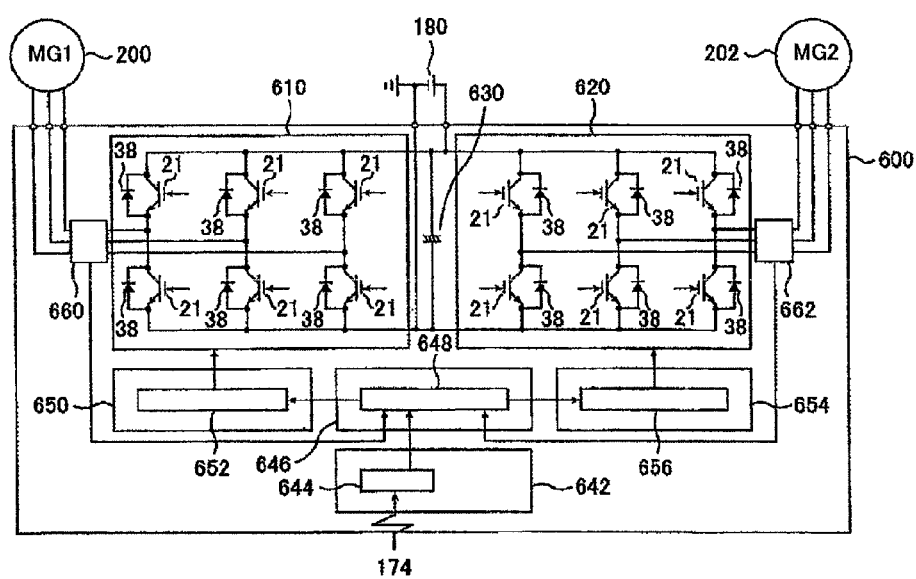
FIG. 2 is a circuit diagram showing a power converter of FIG. 1.

As shown in FIG. 2, the power converter 600 includes a first inverter for the first rotating electrical machine 200 and a second inverter for the second rotating electrical machine 202. The first inverter includes a power module 610, a first drive circuit 652 which controls a switching operation of each power semiconductor 21 of the power module 610, and a current sensor 660 which detects a current of the rotating electrical machine 200. The drive circuit 652 is provided in a drive circuit substrate 650.

The second inverter includes a power module 620, a second drive circuit 656 which controls a switching operation of each of the power semiconductors 21 of the power module 620, and a current sensor 662 which detects a current of the rotating electrical machine 202. The drive circuit 656 is provided in a drive circuit substrate 654.

Current sensors 660 and 662 and drive circuits 652 and 656 are connected to a control circuit 648 provided in a control circuit substrate 646, and moreover, the control circuit 648 is connected to the communication line 174 via the transmitting/receiving circuit 644. The transmitting/receiving circuit 644 is provided in a transmitting/receiving circuit substrate 642 and commonly shared between the first inverter and the second inverter. The transmitting/receiving circuit 644 is used for electrically connecting between the power converter 600 and an external controller and transmits and receives information with another device via the communication line 174 of FIG. 1.

The control circuit 648 constitutes a controller for each inverter and is constituted of a microcomputer which computes a control signal (control value) used for operating (turning on and off) the power semiconductor elements 21. The control circuit 648 receives inputs of a torque command signal (torque command value) from the integrated controller 170, sensor outputs from the electric current sensors 660 and 662, and sensor outputs from the rotary sensors mounted on the rotating electrical machines 200 and 202, that is, sensor outputs from a resolver 224 (see, FIG. 3). The control circuit 648 computes the control value based on the input signals and outputs control signals used for controlling switching timing of the drive circuits 652 and 656.

The drive circuits 652 and 656 are each provided with six integrated circuits which generate the drive signal to be supplied to a gate of each upper and lower arm of each phase. The six integrated circuits are configured as one block. The drive signals generated by the drive circuits 652 and 656 are respectively output to the gates of the respective power semiconductor elements 21 of the corresponding power modules 610 and 620.

A capacitor module 630 is electrically connected in parallel to terminals on the direct-current side of the power modules 610 and 620, and the capacitor module 630 constitutes a smoothing circuit used for suppressing variations in direct-current voltage generated by the switching operation of the power semiconductor element 21. The capacitor module 630 is commonly shared between the first inverter and the second inverter.

The power modules 610 and 620 respectively convert direct-current power supplied from the battery 180 into a three-phase alternating-current power and supply the power to the stator windings, which are armature windings of the corresponding rotating electrical machines 200 and 202. The power modules 610 and 620 convert alternating-current power induced in the stator windings of the rotating electrical machines 200 and 202 into direct current and supply the direct current to the high-voltage battery 180.

The power modules 610 and 620 are provided with three-phase bridge circuits as shown in FIG. 2, and series circuits corresponding to three phases are electrically connected in parallel between a positive electrode and a negative electrode of the battery 180. Each series circuit includes a power semiconductor element 21 constituting an upper arm and a power semiconductor element 21 constituting a lower arm, and these power semiconductors 21 are connected in series to each other.

The power module 610 and the power module 620 have a substantially similar configuration. Here, the power module 610 will be described below as a representative.

The power module 610 uses an IGBT (insulated gate bipolar transistor) as a power semiconductor element for switching. The IGBT includes three electrodes, namely, a collector electrode, an emitter electrode, and a gate electrode. A diode 38 is electrically connected to between the collector electrode and the emitter electrode of the IGBT. The diode 38 includes two electrodes, namely, a cathode electrode and an anode electrode. The cathode electrode is electrically connected to the collector electrode of the IGBT, and the anode electrode is electrically connected to the emitter electrode of the IGBT so that a direction from the emitter electrode to the collector electrode of the IGBT is the forward direction.

The arm of each phase is configured by electrically connecting the emitter electrode of the IGBT to the collector electrode of the IGBT in series.

Although only one IGBT of each of the upper and lower arms of the respective phases is shown in FIG. 2, a plurality of IGBTs is electrically connected in fact in parallel because a current capacity to be controlled is large.

The collector electrode of the IGBT of each upper arm of each phase is electrically connected to the positive electrode of the battery 180, and the emitter electrode of the IGBT of each lower arm of each phase is electrically connected to the negative electrode of the battery 180. An intermediate point of each arm of each phase (a connection portion between the emitter electrode of the IGBT on the upper arm side and the collector electrode of the IGBT on the lower arm side) is electrically connected to an armature winding (stator winding) of the corresponding phase of the corresponding rotating electrical machines 200 and 202.

Since the rotating electrical machines 200 and 202 have a substantially similar configuration, the rotating electrical machine 200 will be described below as a representative.

[Configuration of Rotating Electrical Machine]

Figure 3:
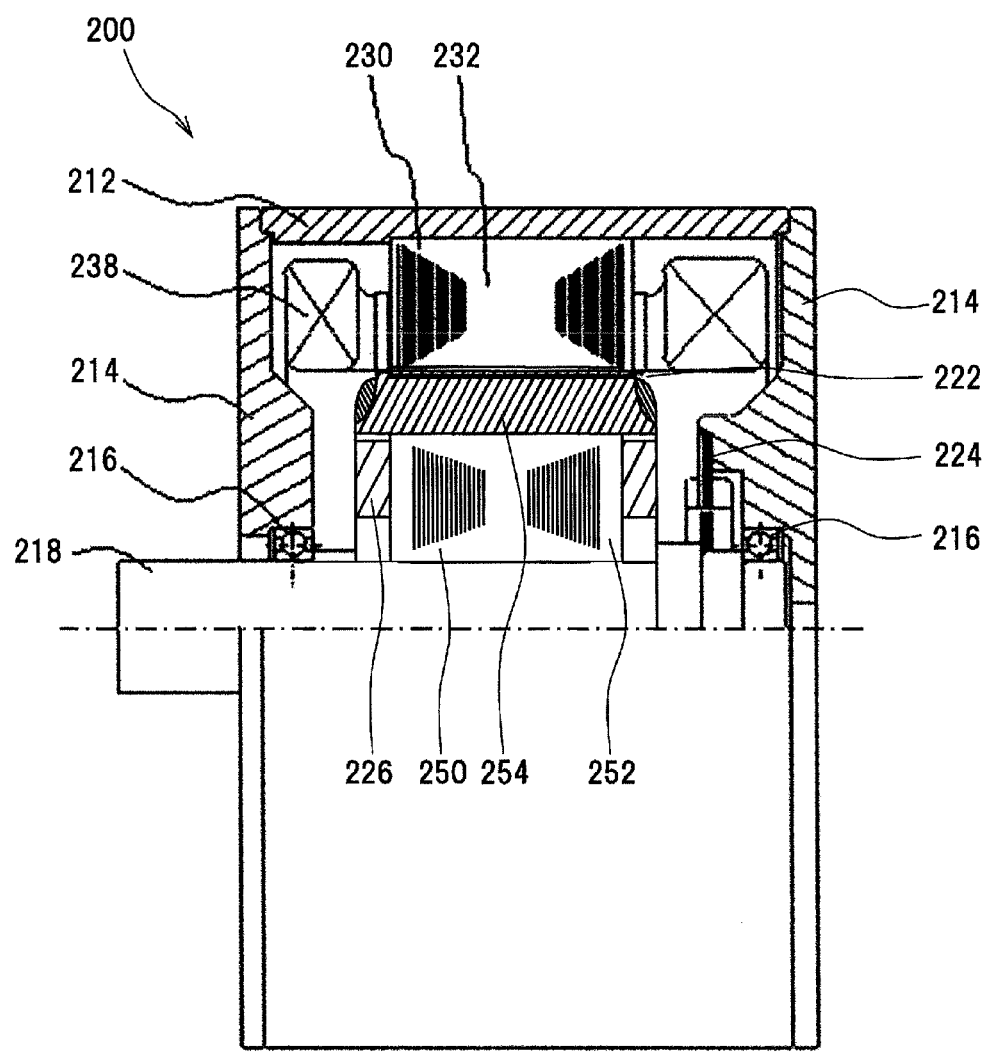
FIG. 3 is a cross-sectional view showing a rotating electrical machine according to the first embodiment of the present invention.

As shown in FIG. 3, the rotating electrical machine 200 has a housing 212 and a stator 230 held in the housing 212, and the stator 230 includes a stator core 232 and stator windings 238. A rotor 250 is rotatably held inside the stator core 232 via a gap 222. The rotor 250 includes a rotor core 252, a conductor bar 254, and an end ring 226, and the rotor core 252 is fixed to a cylindrical shaft (rotary shaft body) 218.

The housing 212 has a pair of end brackets 214 provided with bearings 216, and the shaft 218 is rotatably held by the bearings 216. The shaft 218 is rotatably held by the bearings 216. The shaft 218 includes a resolver 224 which detects the rotational position and the rotation speed of the rotor 250. The output of the resolver 224 is input to the control circuit 648 shown in FIG. 2.

Referring to FIG. 2, the control circuit 648 controls the drive circuit 652 based on the output of the resolver 224. The drive circuit 652 makes the power module 610 perform the switching operation and converts the direct-current power supplied from the battery 180 into three phase alternating-current power. In a similar manner, the control circuit 648 makes the power module 620 perform the switching operation via the drive circuit 656 and converts the direct-current power supplied from the battery 180 into three phase alternating-current power. The three phase alternating-current power is supplied to the stator windings 238, and a rotating magnetic field is generated in the stator 230. The frequency of the three phase alternating-current power is controlled based on the detection value of the resolver 224. Likewise, the phase of the three phase alternating-current power corresponding to the rotor 250 is controlled based on the detection value of the resolver 224, and the three phase alternating-current power is supplied to the stator windings 238.

[Stator]

As shown in FIG. 3, the stator 230 includes a cylindrical stator core 232 and the stator windings 238 inserted and mounted to the stator core 232. The stator core 232 is formed by stacking a plurality of annular magnetic steel sheets. The magnetic steel sheet constituting the stator core 232 has a thickness of approximately 0.05 to 1.0 mm and is formed by punching or etching.

The stator core 232 is formed by stacking the magnetic steel sheets so that a plurality of slots (not shown) extending in the axial direction of the stator core 232 is arranged at equal intervals in the circumferential direction. The slot is provided with insulating paper (not shown) corresponding to the slot shape and stores phase windings of U, V, and W phases constituting the stator windings 238. Teeth provided between the slots lead the rotating magnetic field generated by the stator windings 238 to the rotor 250, and rotating torque is generated in the rotor 250.

This embodiment employs the distributed winding as the way to wind the stator windings 238. The term "distributed winding" as used herein means a winding system in which the phase windings are wound around the stator core 232 such that the phase winding of each phase is stored in two of the slots spaced apart from each other via other slots.

[Rotor]

Figure 4:
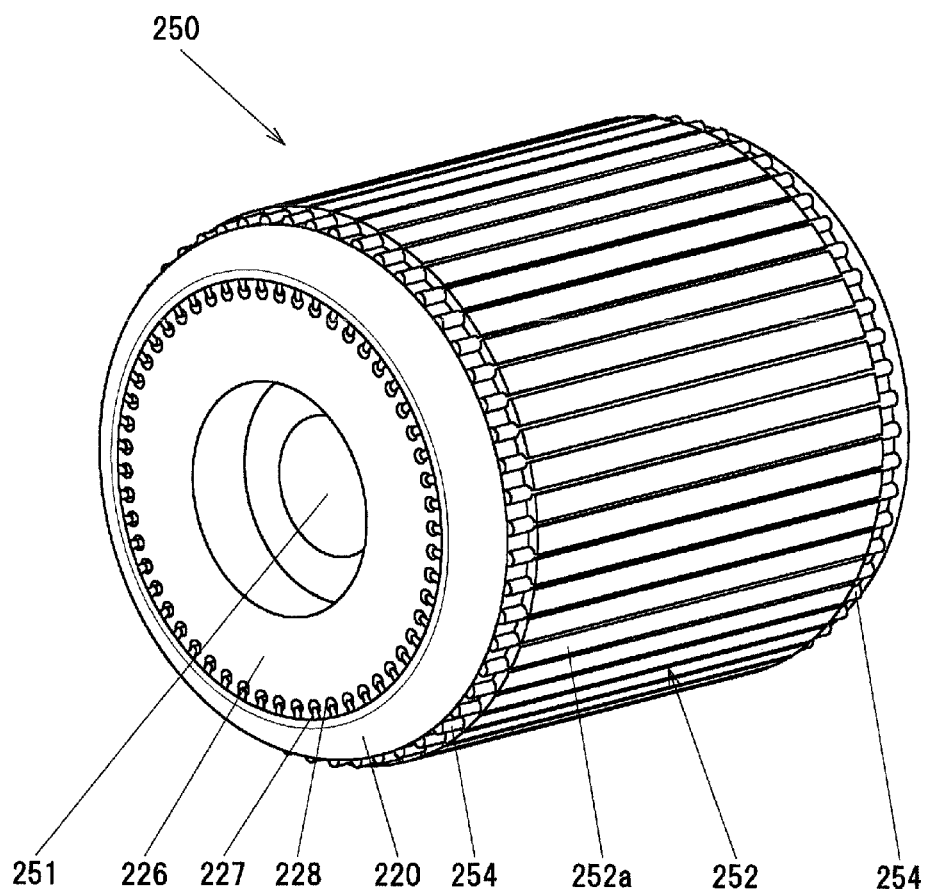
FIG. 4 is an appearance perspective view of the squirrel-cage rotor according to the first embodiment of the present invention.
Figure 5:
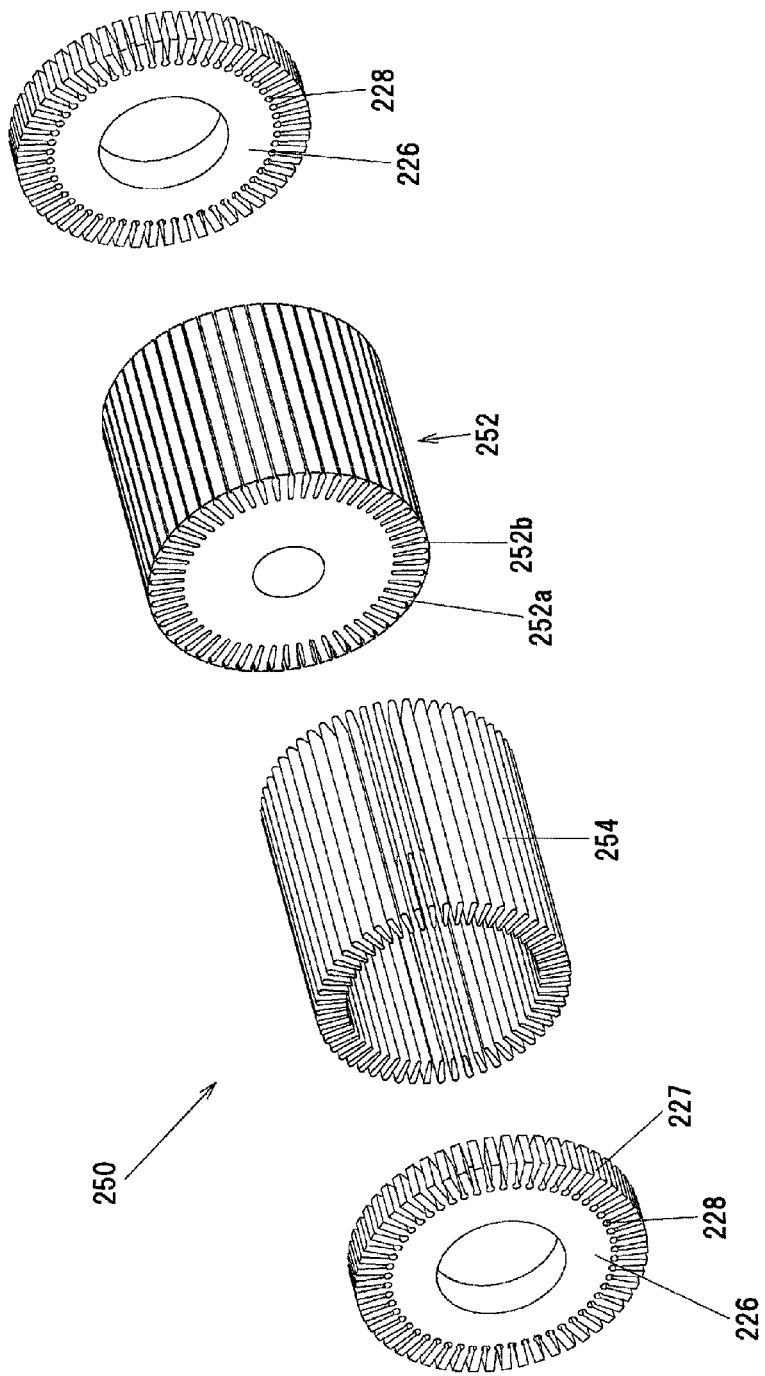
FIG. 5 is an exploded perspective view of the squirrel-cage rotor according to the first embodiment of the present invention.
Figure 6:
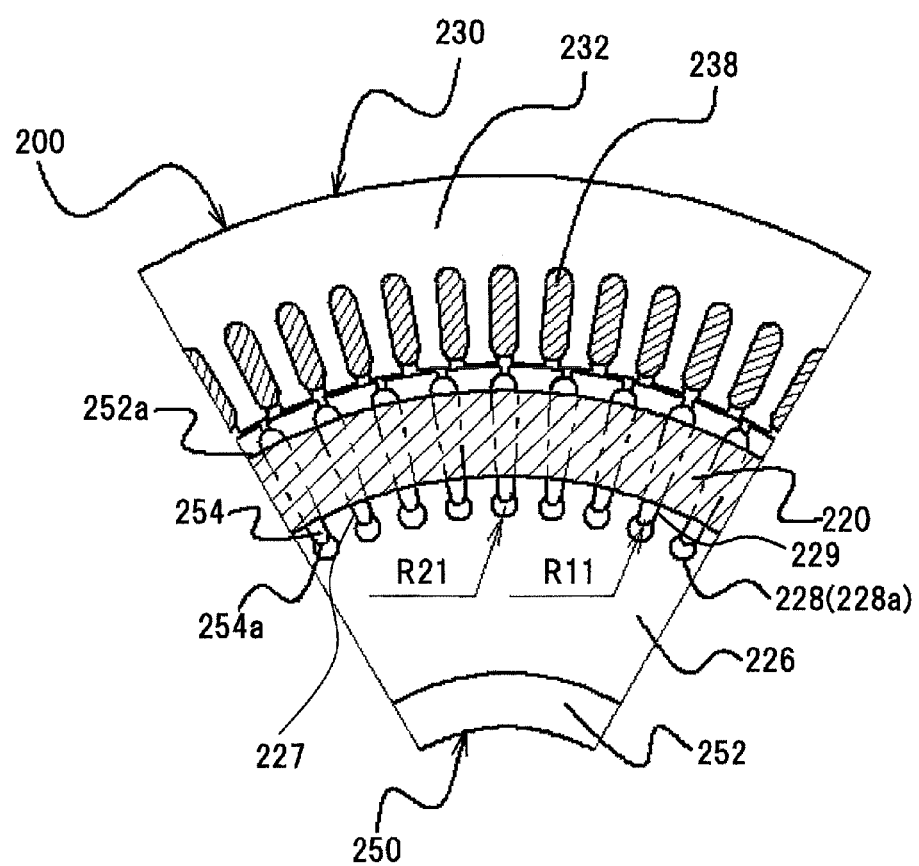
FIG. 6 is a partially enlarged plan schematic diagram showing an end ring of the squirrel-cage rotor according to the first embodiment of the present invention.

FIGS. 4 and 5 are respectively appearance perspective view and exploded perspective view of the rotor 250 according to the first embodiment of the present invention. FIG. 6 is a partially enlarged plan schematic diagram showing the end ring 226 of the rotor 250 according to the first embodiment of the present invention. The illustration of the shaft 218 is omitted. As shown in FIGS. 4 and 5, the rotor 250 according to this embodiment is a built-up squirrel-cage rotor in which a large number of the conductor bars 254 and a pair of the end rings 226 are assembled on the rotor core 252, and the end ring 226 and the conductor bar 254 are joined by welding at the both ends in the axial direction of the rotor 250.

In the first embodiment of the present invention, a circular arc gap portion 228 slightly larger than the front end (center-side end 254a) of the conductor bar 254 is previously formed in a fitting portion 227 of the end ring 226 (see, FIG. 6), whereby stress, concentration applied to the end ring 226 due to the rotation centrifugal force generated when the rotor 250 is rotated at high speed is relieved. Hereinafter, the configuration of the rotor 250 and each configuration of the conductor bar 254 and the end ring 226 will be described in detail.

As shown in FIGS. 4 and 5, the rotor 250 has a cylindrical shape having a through-hole 251 through which the shaft 218 (see, FIG. 3) is inserted. The rotor 250 includes the cylindrical rotor core 252, the conductor bars 254 inserted and mounted to the slot 252b of the rotor core 252, and a pair of the end rings 226 arranged at the both ends of the rotor core 252 and electrically connected to the conductor bar 254 by welding.

[Rotor Core]

The rotor core 252 is formed by stacking the annular magnetic steel sheets. The magnetic steel sheet constituting the rotor core 252 has a thickness of approximately 0.05 to 1.0 mm and is formed by punching or etching. In the rotor core 252, a plurality of teeth 252a parallel in the axial direction and the slots 252b are formed so as to be arranged at equal intervals in the circumferential direction.

The width (length in the circumferential direction) of the teeth 252a of the rotor core 252 is substantially constant outward in a radial direction from the rotation center side (base portion). The width of the slot 252b partitioned by the teeth 252a adjacent to the slot 252b is maximum on the outer circumferential side (opening side). The width is gradually reduced inward in the radial direction from the outer circumferential side, and the width is minimum on the rotation center side.

The long flat plate shaped conductor bar 254 is stored in each of the slots 252b, and the both ends in the longitudinal direction of the conductor bar 254 are fitted in the pair of end rings 226 arranged on the both ends of the rotor core 252.

[Conductor Bar and End Ring]

The conductor bar 254 is formed of metal such as copper and aluminum and is a long flat plate shaped member extending in the axial direction of the rotor 250. The outer shape of the conductor bar 254 is substantially the same as the shape of the slot 252b of the rotor core 252, and the conductor bar 254 is stored in the slot 252b. In the conductor bar 254, the cross-sectional shape in a plane perpendicular to the rotation central axial direction of the rotor 250 has a taper shape in which the thickness is gradually reduced from the outer circumferential side of the rotor 250 toward the center, and the shape on the rotor central axis side is a circular arc.

As shown in FIG. 6, in the conductor bar 254, a flat side surface is formed so that the thickness is gradually reduced from the outer circumferential side of the rotor 250 toward the center, a circular arc center side end 254a is formed extending from the both side surfaces toward the center axis of the rotor 250, and the circular arc outer end is formed extending outward in the radial direction of the rotor 250 from the both side surfaces.

As shown in FIG. 4, the conductor bar 254 is formed to have a length larger than the axial direction length of the rotor core 252, and the both ends of the conductor bar 254 project outward from the axial direction end surface of the rotor core 252.

A pair of the end rings 226 is formed of metal such as copper and aluminum as in the conductor bar 254, and the end rings 226 are arranged on the both ends of the rotor core 252. Each of the end rings 226 has a plurality of fitting portions 227 into which the end of the conductor bar 254 projecting from the axial direction end surface of the rotor core 252 is fitted. A plurality of the fitting portions 227 is formed at equal intervals in the circumferential direction, corresponding to the slots 252b of the rotor core 252. Each of the fitting portions 227 is formed into a groove shape which is a through-hole parallel to the axial direction and has an open outer peripheral side.

The end in the longitudinal direction of the conductor bar 254 is fitted in each of the fitting portions 227 of each of the end rings 226, and the conductor bar 254 is joined by welding to the end ring 226, whereby an annular joining portion 220 is formed.

[Fitting Portion]

The shape of the fitting portion 227 of the end ring 226 will be described in detail with reference to FIG. 6. The fitting portion 227 has substantially the same cross-sectional shape as the conductor bar 254 and has a holding portion 229 holding the conductor bar 254 and a gap portion 228 provided extending from the holding portion 229 toward the central axis of the rotor 250.

The gap portion 228 is formed as a circular arc portion 228a having a radius larger than the radius of the circular arc which is the circular arc center side end 254a of the conductor bar 254. As shown in FIG. 6, a relationship between a radius R21 of the gap portion 228 (circular arc portion 228a) provided at the end on the central axis side of the rotor 250 in the fitting portion 227 and a radius R11 of the circular arc center side end 254a of the conductor bar 254 is R21>R11, and in this embodiment, R21≈1.8×R11.

As shown in FIG. 6, the conductor bar 254 is fitted in the fitting portion 227 of the end ring 226 so that the gap portion 228 (the circular arc portion 228a) and the center-side end 254a of the conductor bar 254 are provided face to face. In the plane perpendicular to the central axial direction of the rotor 250, a space is formed between the center-side end 254a of the conductor bar 254 and the gap portion 228 (the circular arc portion 228a).

According to the present embodiment described above, the following advantages can be offered.

The gap portion 228 (the circular arc portion 228a) having a radius larger than the radius of the circular arc center side end 254a of the conductor bar 254 is provided at the fitting portion 227 of the end ring 226. When the rotor 250 is rotated at high speed, rotation centrifugal force is applied to the end ring 226, and tensile stress is generated in the circumferential direction. The gap portion 228 is formed into a circular arc shape having a radius larger than the radius of the circular arc center side end 254a of the conductor bar 254, whereby stress concentration applied to the gap portion 228 (the circular arc portion 228a) of the end ring 226 is relieved. Accordingly, damage of the end ring 226 due to the rotation centrifugal force generated by rotating the rotor 250 at high speed can be prevented.

[Comparison with the Conventional Technique]

Figure 7:
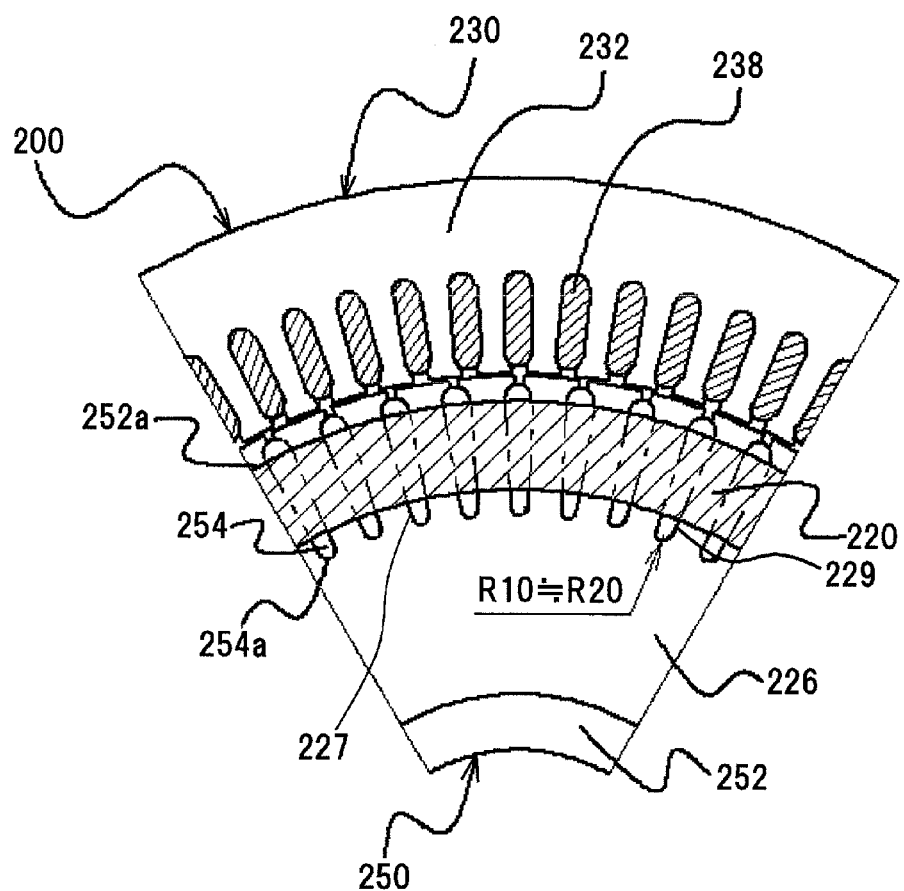
FIG. 7 is a partially enlarged plan schematic diagram showing an end ring of a conventional squirrel-cage rotor.
Figure 8:
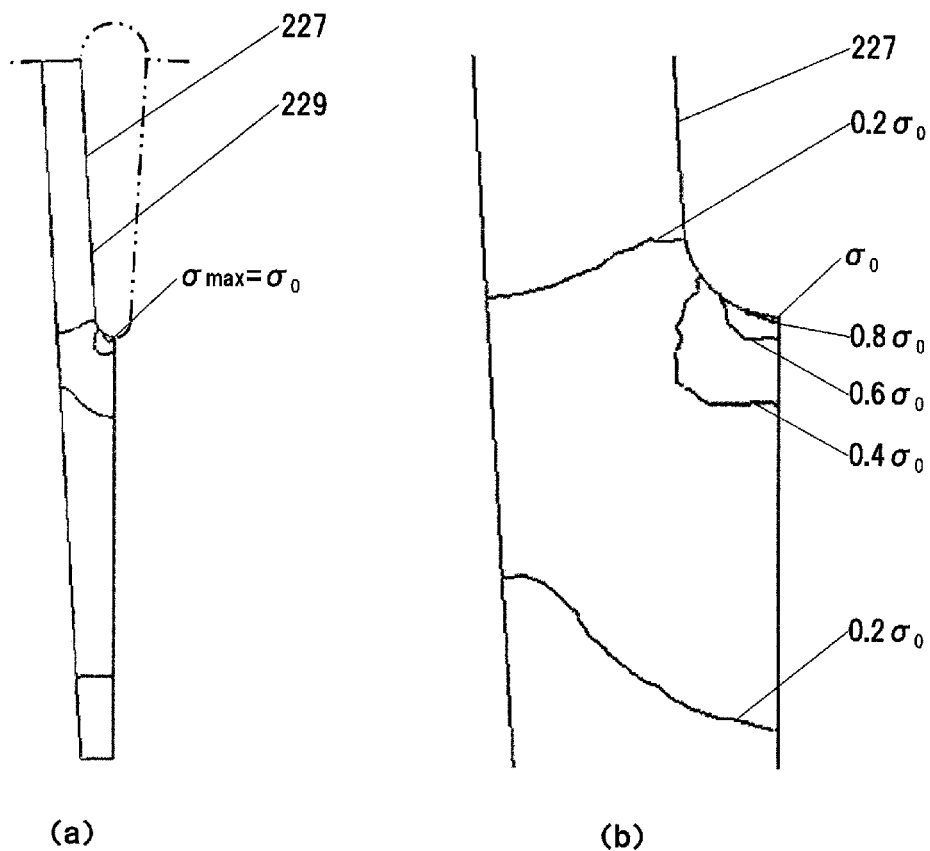
FIG. 8 is a view showing stress distribution of the end ring of the conventional squirrel-cage rotor.
Figure 9:
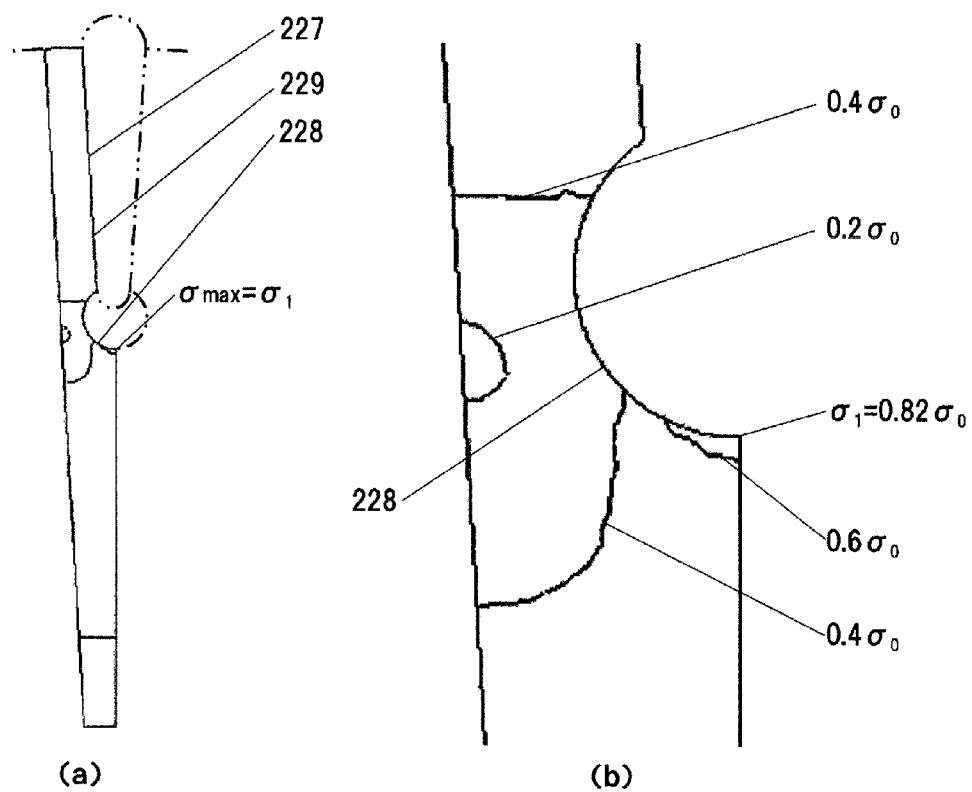
FIG. 9 is a view showing the stress distribution of the end ring of the squirrel-cage rotor according to the first embodiment of the present invention.

The effect of relieving the stress concentration described above will be described by comparing numerical analysis results corresponding to the end ring 226 of the conventional technique with the end ring 226 of the first embodiment. FIG. 7 is a partially enlarged plan schematic diagram showing the end ring 226 of the rotor 250 of the conventional technique. In the drawing, the same or equivalent portions as the first embodiment are assigned the same reference numerals, and the description will be omitted. FIG. 8 is a view showing stress distribution of the end ring 226 of the conventional rotor 250 shown in FIG. 7. FIG. 9 is a view showing the stress distribution of the end ring 226 of the rotor 250 according to the first embodiment of the present invention. FIGS. 8 and 9 are contour figures of the analysis results in which when a value of a maximum stress σmax=σ0 is 100% in the conventional end ring 226 shown in FIG. 8, stress change is displayed at an interval of 20%.

As shown in FIG. 7, in the conventional rotor 250, although the conductor bar 254 and the rotor core 252 are similar to those of the first embodiment of the present invention, the shape of the fitting portion 227 of the end ring 226 is different, and the center-side end (end on the rotation central axis side of the rotor 250) of the fitting portion 227 of the conventional end ring 226 has substantially the same shape as the circular arc center side end 254a of the conductor bar 254. Namely, R20 (radius of the center-side end of the fitting portion 227) ≈R10 (radius of the center-side end 254a of the conductor bar 254).

As shown in FIGS. 8 and 9, when the rotor 250 rotates, the maximum stress σmax is generated at a portion of the fitting portion 227 closest to the rotation center of the rotor 250.

As shown in FIG. 9, the maximum stress σmax=σ1 of applied to the fitting portion 227 of the end ring 226 according to the first embodiment is reduced to 82% than ever before. As shown in FIGS. 8 and 9, in the first embodiment, since the stress change is gradual than ever before, the stress applied to the entire end ring 226 is suppressed, and the stress concentration is relieved.

Second Embodiment

Figure 10:
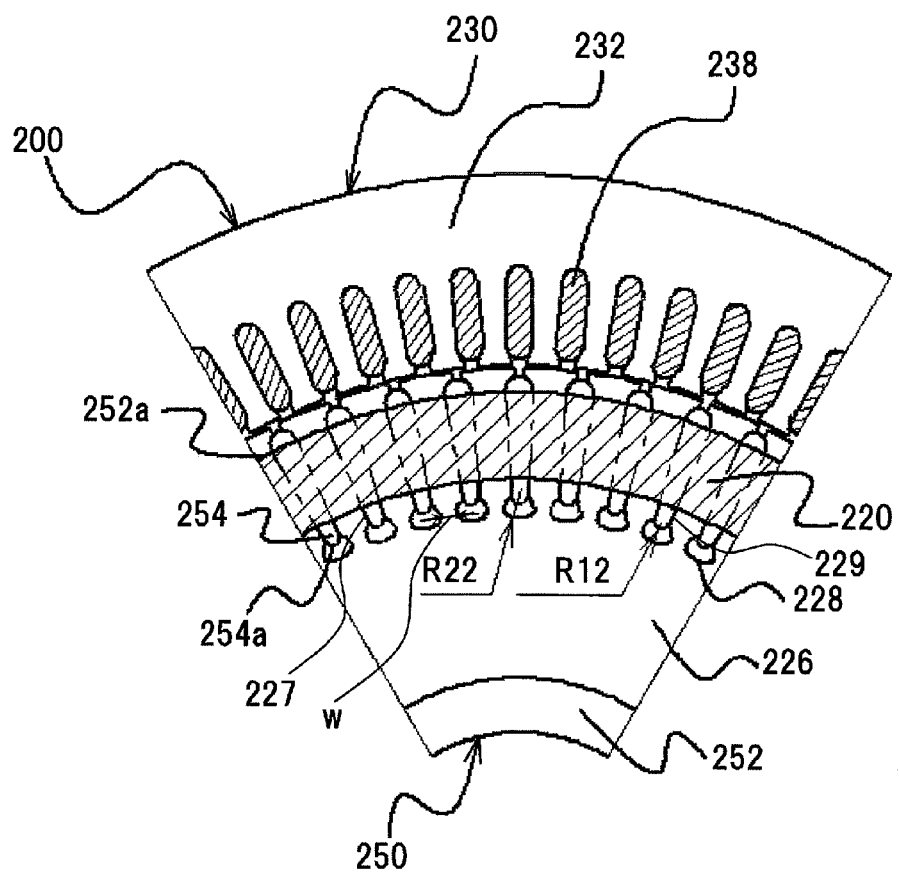
FIG. 10 is a partially enlarged plan schematic diagram showing an end ring of a squirrel-cage rotor according to a second embodiment of the present invention.
Figure 11:
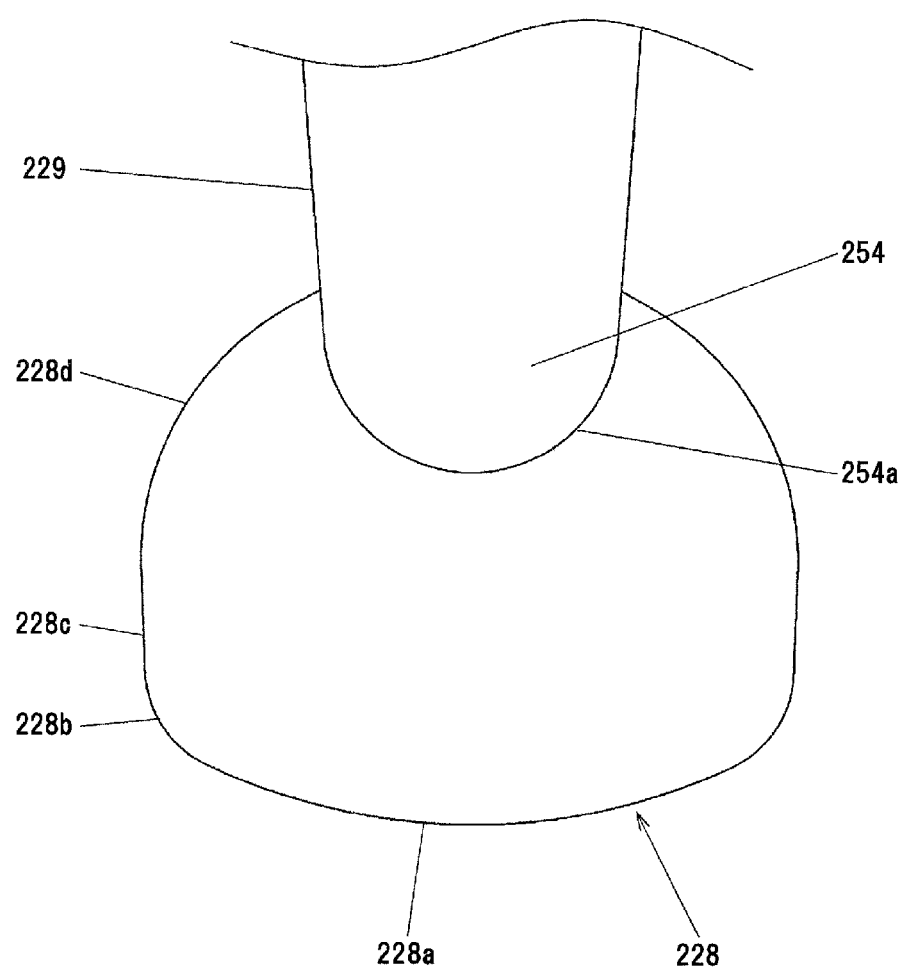
FIG. 11 is a partially enlarged view showing a gap portion of the end ring of the squirrel-cage rotor according to the second embodiment of the present invention.

Next, a second embodiment of a rotor 250 and a rotating electrical machine 200 according to the present invention will be described with reference to FIGS. 10 and 11. FIG. 10 is a partially enlarged plan schematic diagram showing an end ring 226 of the rotor 250. FIG. 11 is a partially enlarged view showing a gap portion 228 of the end ring 226 of the rotor 250. In the drawings, the same or equivalent portions as the first embodiment are assigned the same reference numerals, and points different from the first embodiment will be mainly described. The gap portion 228 of the second embodiment generally has a flat shape in comparison with the shape of the gap portion 228 of the first embodiment.

As shown in FIGS. 10 and 11, in the second embodiment, the entire gap portion 228 is not formed into a circular arc shape, and the center-side end of the gap portion 228 (end on the rotation central axis side of the rotor 250) is formed as a circular arc portion 228a having a relatively large radius. A radius R22 of the circular arc portion 228a is larger than a radius R12 of a center-side end 254a of a conductor bar 254. Namely, R22>R12, and in this embodiment, R22≈4.1×R12.

The cross-sectional shape of the gap portion 228 in a plane perpendicular to the axial direction of the rotor 250 will be described. As shown in FIG. 11, the circular arc portion 228a of the gap portion 228, which is located at a position closest to the rotation center side of the rotor 250, expands to a predetermined width in the circumferential direction. A curved portion 228b curved toward the conductor bar 254 is provided at the both ends of the circular arc portion 228a, and a linear portion 228c extends from the curved portion 228b toward the conductor bar 254. The curved portion 228d extends from the linear portion 228c toward a holding portion 229 holding the conductor bar 254. Since the linear portion 228c is provided from the both ends of the circular arc portion 228a toward the conductor bar 254 via the curved portion 228b, a predetermined width w is secured between the linear portions 228c of the gap portions 228 adjacent to each other (see, FIG. 10).

Figure 12:
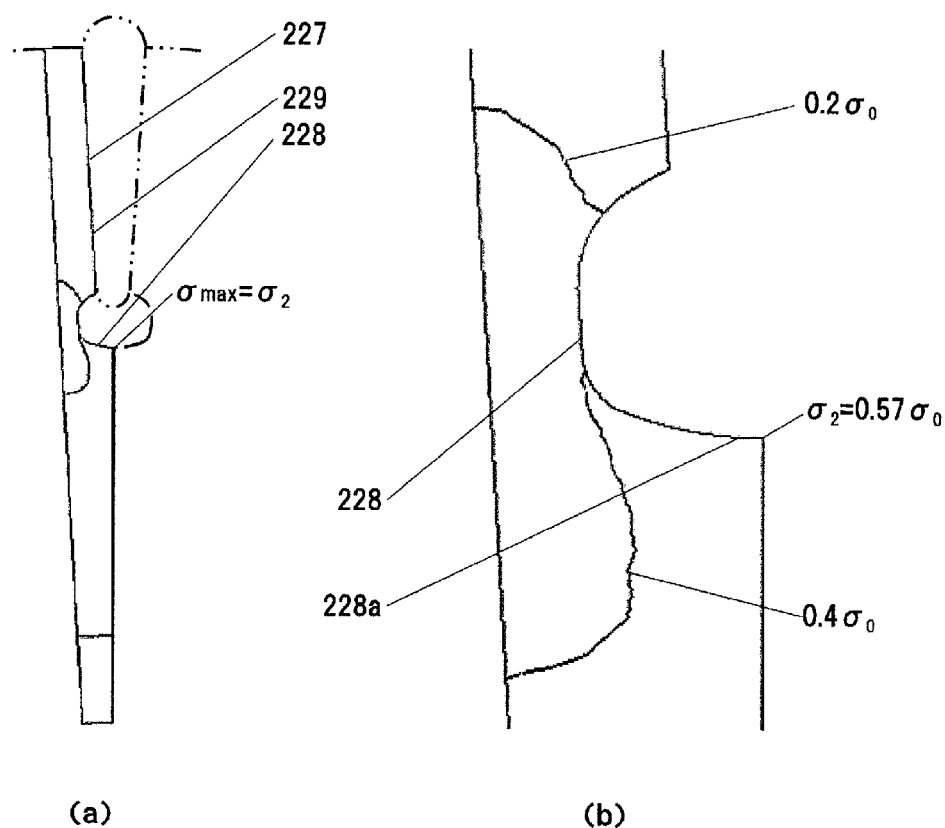
FIG. 12 is a view showing the stress distribution of the end ring of the squirrel-cage rotor according to the second embodiment of the present invention.

FIG. 12 is a view showing the stress distribution of the end ring 226 of the rotor 250 according to the second embodiment of the present invention. FIG. 12 is a contour figure of the analysis results in which when a value of a maximum stress σmax=σ0 in the end ring 226 of the conventional technique shown in FIG. 8 is 100%, stress change is displayed at an interval of 20%.

In the second embodiment, as shown in FIG. 12, the maximum stress σmax=σ2 applied to a portion of the gap portion 228 closest to the rotation center is reduced to 57% than ever before, and the stress change is gradual; therefore, the stress applied to the entire end ring 226 is suppressed, and the stress concentration is relieved.

According to the second embodiment, a predetermined width w (see, FIG. 10) is secured between the linear portions 228c of the gap portions 228 adjacent to each other in the circumferential direction, whereby electrical resistance is not increased, and the circular arc portion 228a having a radius larger than that of the first embodiment can be formed. Consequently, the stress concentration can be more relieved than the first embodiment.

[Effects of Circular Arc Portion]

Figure 13:
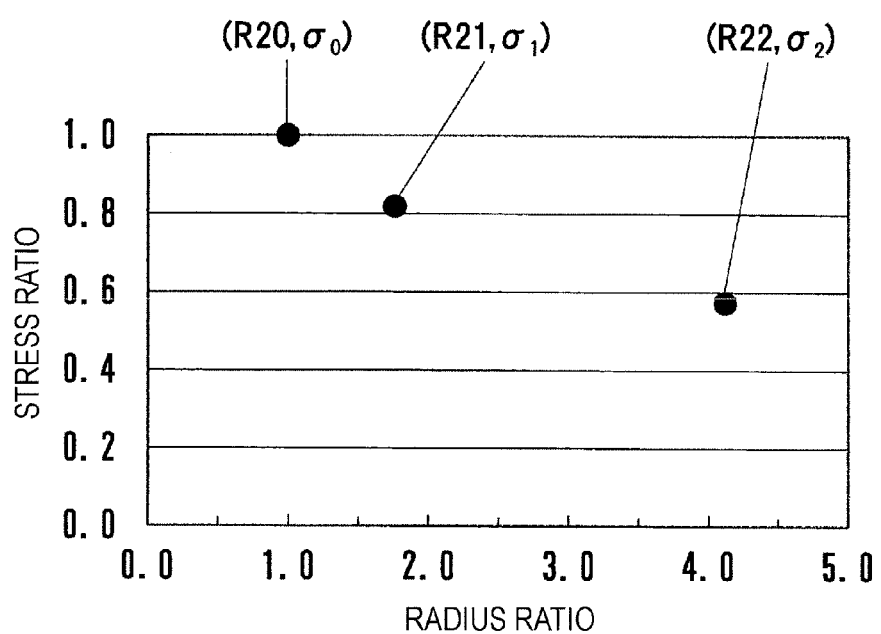
FIG. 13 is a graph showing a relationship between a radius of a circular arc portion and maximum stress generated in the end ring.

FIG. 13 is a graph showing numerical analysis results (maximum stress value) corresponding to the end rings of the conventional technique and the first and second embodiments and shows a relationship between the radius of the center-side end (the circular arc portion 228a) of the fitting portion 227 and the maximum stress generated in the end ring 226. In FIG. 13, when the maximum stress σmax=σ0=1.0 applied to the conventional rotor 250 and the radius R20 of the center-side end of the fitting portion 227 in the conventional rotor 250 is R20=1.0, stress ratios of the maximum stress values σ1 and σ2 in the first and second embodiments with respect to σ0 and radius ratios R21 and R22 in the first and second embodiments with respect to R20 are plotted. As shown in FIG. 13, it can be confirmed that there is a tendency for the maximum stress value to be reduced as the radius of the circular arc portion 228a increases, and the effectiveness of the gap portion 228 according to the embodiment of the present invention can be verified.

The following variations fall within the scope of the present invention, and one of or a plurality of the variations may be adopted in combination with the embodiments described above.

(1) The joining method between the conductor bar 254 and the end ring 226 is not limited to welding, and the conductor bar 254 and the end ring 226 may be joined by a joining method such as friction stir welding (FSW), brazing, and ultrasonic soldering.

(2) In the second embodiment, the curved portions 228b and 228d and the linear portion 228c constituting the gap portion 228 may have various shapes. The radius of the circular arc portion 228a may be larger than the radius of the center-side end 254a of the conductor bar 254, a portion connecting the circular arc portion 228a and the holding portion 229 may have any shape as long as it does not have a corner. The connecting portion may have a shape that continuously connects the circular arc portion 228a and the holding portion 229 through a plurality of curved portions without having the linear portion 228c.

(3) As a power semiconductor element for switching, a MOSFET (metal-oxide semiconductor field-effect transistor) may be used instead of IGBT. The MOSFET has three electrodes, namely, a drain electrode, a source electrode, and a gate electrode. Since the MOSFET includes a parasitic diode between the source electrode and the drain electrode such that the direction from the drain electrode to the source electrode is the forward direction, the diode 38 of FIG. 2 is not required to be provided.

In the above description, although various embodiments and variations are described, the present invention is not limited to the above contents. Other aspects considered in the technical scope of the invention fall within the scope of the present invention.

The disclosed contents of the following basic priority application are herein incorporated as a reference: Japanese Patent Application No. 2011-038714 (filed on Feb. 24, 2011).

The invention claimed is:

1. A squirrel-cage rotor comprising:
a rotor core including in its circumferential direction a plurality of slots extending in an axial direction;
a plurality of conductor bars which is stored in each slot of the rotor core and whose both ends are projected from an axial direction end surface of the rotor core; and
a pair of end rings arranged at the both ends of the rotor core and each having a plurality of fitting portions into which the respective both ends of the conductor bars projecting from the axial direction end surface of the rotor core are fitted,
wherein in the conductor bar, among the cross-sectional shape in a plane perpendicular to the axial direction, the shape on the rotor central axis side is a circular arc shape,
in the plane perpendicular to the axial direction, a gap is provided on the rotor central axis side of the fitting portion fitted with the conductor bar, a curved portion is provided on the rotor central axis side of the gap, and
the curved portion of the gap includes a circular arc having a radius larger than a radius of the circular arc on the rotor central axis side of the conductor bar.

2. The squirrel-cage rotor according to claim 1, wherein the curved portion of the gap is provided as a circular arc having a radius larger than the radius of the circular arc on the rotor central axis side of the conductor bar.

3. The squirrel-cage rotor according to claim 2, wherein the cross-sectional shape of the conductor bar in the plane perpendicular to the axial direction is a shape in which the thickness is gradually reduced from the outer circumferential side of the rotor toward the center side, and
the curved portion of the gap is provided to face the circular arc of the end on the rotor central axis side of the conductor bar.

4. A rotating electrical machine comprising:
the squirrel-cage rotor according to claim 2; and
a stator provided at a distance on an outer circumferential side of the squirrel-cage rotor.

5. The squirrel-cage rotor according to claim 1, wherein the cross-sectional shape of the conductor bar in the plane perpendicular to the axial direction is a shape in which the thickness is gradually reduced from the outer circumferential side of the rotor toward the center side, and
the curved portion of the gap is provided to face the circular arc of the end on the rotor central axis side of the conductor bar.

6. A rotating electrical machine comprising:
the squirrel-cage rotor according to claim 5; and
a stator provided at a distance on an outer circumferential side of the squirrel-cage rotor.

7. A rotating electrical machine comprising:
the squirrel-cage rotor according to claim 1; and
a stator provided at a distance on an outer circumferential side of the squirrel-cage rotor.

* * * * *